July 14, 1959

J. E. COUGHLIN 2,895,057

AUTOMATIC SWITCHING APPARATUS

Filed April 11, 1957

INVENTOR
JOSEPH E. COUGHLIN

BY

ATTORNEY

United States Patent Office 2,895,057
Patented July 14, 1959

2,895,057
AUTOMATIC SWITCHING APPARATUS

Joseph E. Coughlin, Easton, Pa., assignor of twenty percent to Harry J. Nichols, Point Pleasant, N.J.

Application April 11, 1957, Serial No. 652,294

11 Claims. (Cl. 307—10)

The present invention relates to automatic switching apparatus and more particularly to a novel combination of switching devices for automatically switching a pair of batteries from normal parallel connection to temporary series connection, and subsequently back to parallel connection.

One major application of the invention is to boost temporarily the voltage of an automotive electrical system so as to augment the torque of the electric motor ordinarily used for starting the engine of an automotive vehicle.

Similar devices of the prior art for switching a pair of batteries from normal parallel connection to temporary series connection have required a complicated arrangement of relays and magnetic circuit-breakers to handle the heavy rush of current which occurs when any typical automotive starter motor is switched to battery for engine cranking action.

In view of the conditions prevailing under the prior art, a major object of the present invention is to provide switching apparatus of the type described characterized by extraordinary simplicity, infallible reliability, certain automatic action, elimination of destructive voltage surges, and utmost economy.

In order to provide a background of the prior art for understanding the salient features of the present invention, it should be noted there is an evident trend to use larger and more powerful engines for powering automotive vehicles. Thus arises the draw-back that six-volt storage batteries, which have long been standard equipment for automobiles and trucks, do not provide sufficient voltage to the starting motor to crank such larger engines during frigid weather. Consequently, automotive starting troubles in cold weather have become increasingly prevalent. To overcome such troubles, recent models of automotive vehicles are usually initially equipped with twelve-volt electrical systems. But the cost of converting existing six-volt automotive electrical systems to complete twelve-volt battery supply is usually prohibitive; since new lamps, ignition devices, horns, generators, accessory motors, etc. would usually be required. As will be clear from the following description, the present invention enables existing automotive vehicles equipped with a standard six-volt electrical system to be provided with increased starting power at a relatively low cost; because the essential added apparatus, including that of the invention, is simple and inexpensive. Moreover, the existing six-volt equipment does not need to be modified nor replaced.

Accordingly, a major object of the present invention is to provide novel and simple means whereby standard automotive electrical equipment, of six-volt rating, can be augmented with a booster battery to provide twelve-volt battery current for engine starting purposes. Another object is to provide a novel combination of known electrical devices whereby two batteries, normally connected in parallel, can be automatically and temporarily connected in series for purposes of supplying a boosted voltage to any desired electrically powered device; while simultaneously excluding other devices, which are normally supplied with current by said batteries, from receiving such boosted voltage.

A further object is to provide a novel combination of means, comprising a solenoid switch and one or more thermally operated switches, which will operate simultaneously to close a main current supply circuit and temporarily open other secondary circuits normally connected to said main supply circuit.

Other objects of the invention will be pointed out in the following description and claims and illustrated in the accompanying drawings, which disclose, by way of example, the basic principle of the invention and the best practical mode of applying that principle.

Figure 1:
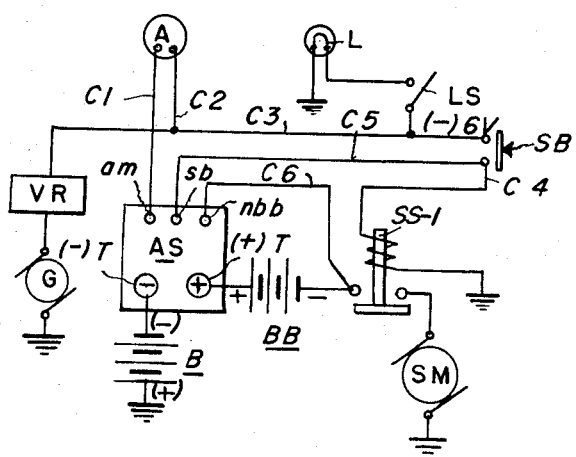
Fig. 1 is an elementary schematic diagram illustrating typical automotive electrical equipment and interconnecting circuits which may be utilized in conjunction with the novel automatic switching device of the invention in carrying out the principle and teaching of the invention.

In the illustrative embodiment of the invention represented in Fig. 1, the various conventional devices comprising a typical electrical system for an automotive vehicle are shown by conventional symbols and connected in normal manner. The main devices include a conventional six-volt storage battery B; an equal additional battery BB, herein termed a "booster battery"; a conventional starting motor SM adapted to be powered by batteries B and BB in either parallel or series connection; and a conventional generator G which is assumed to be driven by an associated automotive engine. The special automatic switch AS, which characterizes the invention, serves to connect batteries B and BB alternatively in parallel and series under remote control by the operator, and to perform other switching and protective functions as hereinafter described.

In the illustrative automotive electric system here being considered by way of example, both the main battery B and booster battery BB are intermittently charged by engine-driven generator G under control of a generator cut-out and voltage regulator VR, of well-known type and function. These batteries supply electrical energy to the vehicle lighting circuits, symbolized by lamp L, under control of lighting switch LS; and may also supply electrical energy to an ignition coil and other devices not shown.

Another main function of batteries B and BB is to supply heavy electrical current to starting motor SM under control of two similar switches SS–1 and SS–2; which latter are preferably of standard solenoid contactor type and remotely controlled from starter button SB. An ammeter A is also usually connected in the electrical circuit between the batteries and generator G; thus to indicate the load current flowing from batteries B and BB, or charging current to those batteries when they are being charged by generator G.

It should be noted in Fig. 1 that starting motor SM appears to be connected in a series circuit from ground through battery B, via automatic switch AS, booster battery BB, starter switch SS–1 and starter motor SM back to ground, as indicated. However, this is the actual circuit condition only during starting operations. Normally, batteries B and BB are connected in parallel by automatic switch AS, as described hereinafter, in such manner that both batteries can be charged by generator G.

Figure 2:
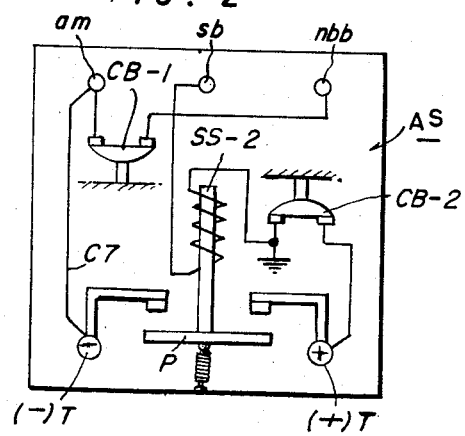
Fig. 2 is a similar schematic diagram representing the unitary novel automatic switching device of the invention, shown in normal condition.
Figure 5:
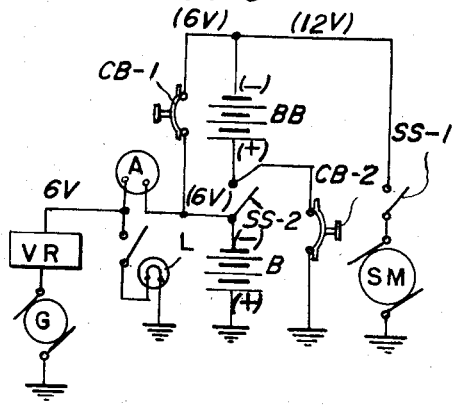
Fig. 5 is a schematic circuit diagram of a typical automotive electrical system, including the automatic switch of the invention, on which is indicated typical voltages prevailing during normal and starting conditions.

Referring now to Fig. 2, the novel automatic circuit breaker AS of the invention is preferably provided as a complete unit ready for assembly in the main battery circuit, as illustrated; although it is to be understood that the components of switch AS may in some cases be separated physically, but connected electrically in the coordinated relationship indicated in Fig. 5.

Automatic switch AS comprises generally an electro-magnetic, heavy current double break, normally open, single pole switch SS–2 herein termed "series switch" and, preferably of solenoid contactor type like standard automotive starter switch SS–1 and likewise, adapted for remote control from starter button SB according to current automotive practice; and a pair of automatic opening-and-reclosing, over-current circuit breakers CB–1 and CB–2. While other forms of circuit breakers can be used, I have found that for automotive applications the thermally actuated circuit breaker commercially known as "Klixon" and which is manufactured by Metals & Controls Corporation, Attleboro, Massachusetts is particularly well-adapted for use in carrying out the manifold objects of the present invention. Briefly, it suffices here to state that the "Klixon" circuit breaker consists of a current carrying thermostatic bimetal concavo-convex disc normally bridging with powerful pressure a pair of stationary heavy-duty contacts connected to the external controlled circuit; both the bimetal disc and the contacts being mounted on and housed inside a body part of insulating material.

The principle of operation of this circuit breaker is that the bimetal disc will pass a certain amount of current across its stationary contacts without responsive action, but when this amount is exceeded, the bimetal disc suddenly reverses its curvature, snapping away from the contacts and instantly interrupting the current. While this device is thermally actuated, it can respond very quickly to large overload currents; thus breaking the circuit substantially simultaneously with the occurrence of over-current. After self-opening, the circuit breaker remains open for a substantial time interval before automatically reclosing with snap-action, this interval being predetermined by the design and materials of the bimetal disc. The device also includes means for adjusting the amount of over-load current which will cause the switch to operate. This preferred type of circuit breaker gains many advantages over other types of relays and switches, which have heretofore been used; such at utmost simplicity and compactness, low cost, fully reliable action, positive holding and fast opening, long interval before reclosing, rapid reclosing action and instantaneous reopening should any over-load condition prevail. Further highly important advantages are that this positive-action device overcomes the drawbacks of ordinary, normally-closed relays which are prone to be jarred open by vibration and road-jolts; whereupon the relay contacts may stick or weld and fail to open when required; thus causing malfunctions, short circuits, burnouts, etc. Other advantages will become evident from the following description of the operation of a typical system embodying the invention.

Referring now to Fig. 2 in conjunction with Fig. 1, automatic switch AS is provided with main terminals (−)T and (+)T; which are connected by heavy conductors to the heavy-duty contacts of series switch SS–2. In use, terminal (−)T is connected by a heavy conductor to the minus pole of battery B; and terminal (+)T is likewise connected to the positive pole of battery BB.

Automatic switch AS is also provided with secondary terminals $am$, $sb$ and $nbb$; terminal $am$ being connected internally by conductor C7 to terminal (−)T, while terminal $sb$ is connected to the solenoid coil of switch SS–2. Circuit breaker CB–1 is connected between terminals $am$ and $nbb$; while circuit breaker CB–2 is connected between terminal (+)T and ground. In use, terminal $am$ is connected by conductor C1 to ammeter A; terminal $sb$ is connected by conductor C5 to starter button SB; and terminal $nbb$ is connected by conductor C6 to the negative side of battery BB. The heavy conductors and heavy-duty contacts of solenoid switches SS–1 and SS–2 carry safely the heavy battery current which is supplied to the starting motor SM. The lighting circuit C3 leading from generator G to lights L, and other electrical devices is alternately supplied with six-volt current from both batteries via AS, conductor C1, ammeter A, and conductor C2, as indicated.

Figure 3:
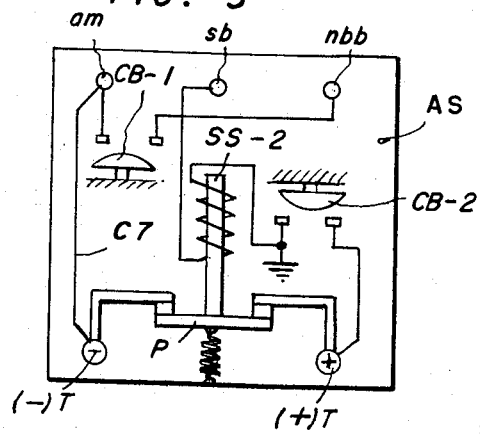
Fig. 3 is a similar schematic diagram showing the same device in temporary operated condition, as during engine starting.

Referring now to Fig. 3, which shows automatic switch AS of Fig. 2 during the second phase of an operating cycle, it should be noted that the contacts of heavy current switch SS–2 are closed by electro-magnetic actuation of plunger P, but that the contacts of circuit breakers CB–1 and CB–2 have been opened automatically by over-load current upon closing of series switch SS–2. These conditions are initiated by closing starter button SB; whereby the coils of solenoids SS–1 and SS–2 are energized in the usual way. The quick-opening of circuit breaker CB–1 by short circuit current derived from battery BB upon the closing of series switch SS–2 breaks the circuit between terminal $am$ and terminal $nbb$ of automatic switch AS; the purpose being to disconnect the negative end of battery BB from the 6-volt secondary circuits. By referring to Fig. 5 it can be seen that upon closing of series switch SS–2, circuit breaker CB–1 short-circuits battery BB and thus prevents the 12-volt potential relative to ground, which will momentarily appear at the negative terminal of booster battery BB upon closing of series switch SS–2, from being extended to ammeter A and its associated secondary circuits; thus preventing danger of burning out the electric lamps by over-voltage and possible other damage. Likewise, upon closing of series switch SS–2, short-circuit current derived from battery B causes instantaneous opening of circuit breaker CB–2; thus disconnecting the positive terminal of battery BB from ground and breaking the shunt circuit through CB–2.

Figure 4:
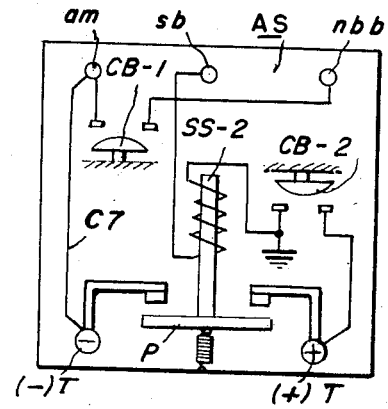
Fig. 4 is a similar schematic diagram showing the same device after engine starting, but before the circuit breakers have automatically restored themselves to normal closed condition.

Referring now to Fig. 4, which shows automatic switch AS during the third phase of the operating cycle, series switch SS–2 is shown as being open, indicating that the engine has been started, and the operator has released starter button SB, thus allowing both solenoid switches to drop out to open position. However, circuit breakers CB–1 and CB–2 remain open for a considerable period, due to controllable delay in reclosing, which is one of the inherent characteristics of the "Klixon" device.

The operation of the electrical system of the invention during one normal starting cycle is therefore as follows: To initiate the starting cycle, the operator pushes starter button SB which closes two branch circuits, C4, and C5; which circuits extend current from lighting circuit C3 to energize the magnet coils of solenoid switches SS–1 and SS–2, respectively. Thereupon, the plungers of these switches close the heavy current contacts, as indicated in Fig. 3, the primary result being to connect batteries B and BB in a series circuit with starter motor SM. Thus, a boosted voltage of twelve volts is applied to the starter motor SM; which causes an abnormally high current to flow through that motor, substantially doubling the normal cranking torque applied to the engine. This increased torque spins the engine much more rapidly than is possible with a 6-volt current supply, thus quickly starting the engine. When the engine starts, the operator of course releases starter button SB, which in turn releases solenoids SS–1 and SS–2, and thus terminates the supply of battery current to starting motor SM.

Somewhat later, circuit breakers CB–1 and CB–2 reclose themselves, which actions reconnect batteries B and BB in parallel between voltage regulator VR and ground; whereupon both batteries are subject to recharge by generator G. Thus, the normal battery capacity is effectively doubled in practice.

It is of course well understood that quick starting of the engine conserves the starting batteries, and accordingly it is found in practice that automotive vehicles equipped with the invention expend much less starting current than would be the case if equipped with the usual 6-volt battery and starting system.

A further substantial practical advantage accruing from the application of the invention is that the usual 6-volt starting motor SM becomes far more efficient, and does not heat up as much as when supplied with 6-volt current. This may appear paradoxical, but follows from the increased momentary starting torque, which improves the efficiency of cranking action; and the quick engine start, which limits the duration of the starting current. Heating of the starting motor depends of course on the amount of starting current used, that is the product of amperage and time of application of the starting current. It is found in practice, contrary to usual objections, that boosting the voltage supplied to an ordinary 6-volt starter motor to 12-volts results in less starting current being used, and consequently less heating of the motor. Thus, the invention conserves the starting motor, as well as the starting batteries. This must be conceded to be an unexpected benefit accruing from the invention.

It may also be noted from Fig. 5 that it is immaterial, with respect to operation, whether starter switch SS–1 or series switch SS–2 closes first. If starter switch SS–1 closes first, 6-volt battery current will be momentarily applied to started motor SM; followed by 12-volt current upon closing of series switch SS–2. If series switch SS–2 closes first, both circuit breakers CB–1 and CB–2 will open, so that upon closing of starter switch SS–1 12-volt current will be applied to starter motor SM, but not to other devices. This means in practice that timing coordination of the switches and circuit breakers is not required. This feature overcomes a serious limitation and drawback of the prior art, wherein a certain sequence of switching operations must be followed to avoid application of over-voltage to the lights and other devices which might be damaged thereby.

Referring again to Fig. 5, it may be noted that even when the batteries are connected in series, no more than the voltage of one battery B can be applied to the normal load circuit, exemplified by lamp L. For, when series switch SS–2 closes, battery BB is short circuited by circuit-breaker CB–1 until the latter opens, preventing any potential rise from battery BB. Thus, the novel combination of the invention positively prevents high voltage surges being applied to the normal load circuit during switching from parallel to series operation of the batteries; thus preventing any damage to voltage sensitive accessories such as lamps, head lights, radios, etc.

Figure 6:
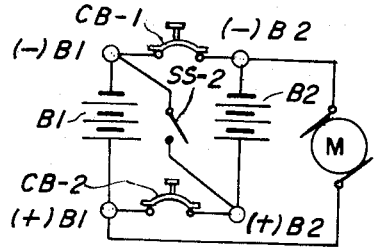
Fig. 6 is an elementary schematic diagram representing the invention as applied to alternate parallel-series switching of two equal batteries.

Referring to Fig. 6, it should be noted that when the automatic switch of the invention is applied for the purpose of switching two equal batteries either to parallel or series operation, series switch SS–2 is connected between unlike poles of the two batteries; while circuit-breakers CB–1 and CB–2 are connected between the pairs of like poles. When switch SS–2 closes, the circuit-breakers are thus connected across their respective batteries, hence heavy "short-circuit" currents flow through them, producing instantaneous opening. Thus, even though the load circuit may be open, the circuit-breakers are opened by heavy short-circuit currents. This feature contributes importantly to utmost reliability of switching action.

From the foregoing, it follows that the invention enables existing 6-volt automotive electrical systems to be converted to 12-volt starting operation at far less cost than would be incurred by installing the conventional 12-volt automotive electrical system, with additional savings of the cost of a 12-volt generator and various accessories. Moreover, after such conversion according to the invention, superior starting performance and utmost reliability of starting is assured.

While the invention has been described for purposes of illustration as contemplating the "conversion," for purposes of improved starting ability, of conventional 6-volt automotive electrical system by the addition of a 6-volt booster battery BB and the novel automatic switch AS, it is to be expressly understood that the invention is not restricted to such application but has various other similar applications. For example, conventional 12-volt electrical starting systems for diesel-engine electric generator sets can be improved by adding 6-volt booster battery BB and automatic switch AS, in accordance with the teaching of the invention. The invention can also be applied to original automotive equipment for automobiles, busses, trucks, tractors, etc., at a very substantial cost-saving over that for providing a conventional automotive electrical system having a voltage rating equal to the boosted starting voltage gained by application of the invention.

While preferred embodiments of the invention have been illustrated and described, it will be apparent to those skilled in the art that various modifications are possible without departing from the scope thereof; and I contemplate by the appended claims to cover such modifications as fall within the true spirit and scope of my invention.

What I claim as new, and desire to secure by letters Patent of the United States, is:

1. Automatic switching apparatus for use with an automotive electrical power supply system including a pair of equal voltage batteries, having, in combination: a normally-open series-switch having a pair of main contacts adapted to carry full battery current when closed and to break said current when opened, said main contacts being connected between two unlike poles of said batteries; a normally-closed automatic over-current circuit-breaker-and-recloser device having a pair of contacts adapted to carry normal battery current connected to two like poles of said batteries; and a duplicate device having a pair of similar contacts connected to the other two like poles of said batteries; whereby said devices normally connect said batteries in parallel relation but upon closing said series-switch said devices responsively to over-current disconnect the like poles of said batteries and subsequently reconnect them after opening of said series-switch.

2. Automatic switching apparatus for switching two equal voltage batteries alternately from parallel to series operation comprising, in combination, a normally-open series-switch connected between two unlike poles of said batteries, and a pair of normally-closed automatic over-current circuit-breaker-and-recloser devices connected between like poles of said batteries, said devices thus normally connecting said batteries in parallel operation; whereby said series-switch upon closing connects said batteries in series operation and also completes a shunt circuit across each battery via one of said devices, whereupon over current then supplied by each battery causes said devices to open thereby to disconnect the like poles of said batteries; said devices then automatically reclosing, subsequent to opening of said series-switch, the connections between like poles of said batteries to restore parallel operation.

3. Unitary automatic switching apparatus for selectively boosting the voltage of twin battery power applications combining a double-break single-pole series-switch having a pair of normally-open main contacts adapted to carry full battery current when connected in series with said batteries; a thermally-actuated automatic double-break circuit-breaker-and-recloser device having a pair of normally-closed current carrying contacts one of which is electrically connected to one of the aforesaid main contacts; and a duplicate device one of whose contacts is electrically connected to the other of the aforesaid main contacts; said series-switch and said devices being operative in combination to switch said twin batteries alternately from parallel to series relation consequent to closing of said series-switch.

4. Unitary automatic switching apparatus, combining a normally-open series-switch having a pair of main contacts adapted to carry over-load current when closed, a thermally actuated normally-closed automatic over-current circuit-breaker-and-recloser device having a pair of normal current carrying contacts one of which is electrically connected to one of the aforesaid main contacts, and a similar device one of whose contacts is electrically connected to the other of the aforesaid main contacts, said devices being connected in series in a closed normal-current carrying circuit; whereby upon closing of the contacts of said series-switch overload current is applied to both said devices, whereupon each device responsively to over-current automatically opens its normally closed circuit and subsequently automatically recloses said circuit, unless said series-switch is closed, whereupon each device repeats circuit-breaking-and-reclosing cycles until said series-switch is opened.

5. A unitary automatic switch device for alternately connecting twin batteries in parallel or series operation combining: a first pair of terminals adapted for connection between unlike poles of said twin batteries; a normally-open series-switch connected between said first pair of terminals; a second pair of terminals adapted for connection to the other unlike poles of said batteries and to an external load circuit; a pair of normally-closed over-current automatic circuit-breaker-and-recloser devices each connected between pairs of terminals of like polarity; and common structural means for mounting the aforesaid elements; said series-switch thus being connected serially between said devices and connectable between unlike poles of said batteries, while said devices are connectable between battery poles of like polarity; whereby upon proper connection of twin batteries to said first pair of terminals either single or double battery voltage can be applied selectively to said external load circuit under control of said series switch.

6. A unitary automatic switch for switching twin batteries alternately from parallel to series connection combining a pair of main terminals adapted for connection to unlike poles of said twin batteries, a normally-open single-pole switch connected between said main terminals; a pair of auxiliary terminals adapted for connection between like poles of said twin batteries and to an external load circuit, and a pair of normally-closed overcurrent circuit-breaker-and-recloser devices each connected to one of said main terminals whereby said switch is connected in series between said devices and is also connectable serially between said twin batteries.

7. An automatic switch for switching twin batteries from parallel to series connection and back to parallel connection combining: a normally-open main-switch having a pair of main contacts adapted to make, carry and break full battery current and adapted for connection between unlike poles of said twin batteries, a pair of normally-closed thermally-actuated overcurrent circuit-breaker-and-recloser devices each connected to one of said contacts and connectable between pairs of like poles of said twin batteries; whereby after proper connection of said batteries, closing operation of said main-switch applies over current from said batteries to both of said devices, whereupon each of said devices performs a circuit-breaking operation followed by a circuit reclosing operation after opening of said main-switch.

8. In automatic switching apparatus for switching a pair of batteries from parallel charging to series operation, the combination of: a normally-open main-switch having a pair of main contacts connectable between unlike poles of said batteries; an automatic overcurrent circuit-breaker-and-recloser device electrically connected to one of said pair of contacts and connectable to an external circuit including one of said batteries; and a second similar device electrically connected to the other of said main contacts and connectable to a second external circuit including the other of said batteries; said main switch thus being connected in series relation between said devices, and connectable in series relation between said batteries whereby closing of said switch applies over-current to said devices to switch said batteries from parallel to series operation.

9. A unitary automatic transfer switch of the character disclosed for switching two batteries from normal parallel connection to temporary series connection and having in combination: a single-pole normally-open solenoid-switch of high current type having a pair of main terminals adapted for connection between unlike poles of said batteries; a pair of over current circuit-breaker-and-recloser devices each having a pair of contacts normally closed by a thermally-actuated element; a pair of secondary terminals adapted for connection to circuits leading to the opposite unlike poles of said batteries, and electrical connections between each of said devices and one of said terminals, whereby said main-switch is connected serially between said devices; and supporting means for mounting the aforesaid combination of elements.

10. A starter system for momentarily boosting the available battery voltage for purposes of starting an engine which includes a pair of storage batteries and a starter motor, comprising, in combination; a starter motor circuit which includes a heavy-current lead with a normally-open solenoid-operated switch connected between opposite poles of said batteries; another heavy-current lead connecting the remaining pole of one battery with a second normally-open solenoid-operated switch and thence with the starter motor; a switch-actuated normally-open control circuit in which said solenoids are connected for energizing upon closing said switch; and two normally-closed sub-circuits extending between like pairs of poles of said batteries, each subcircuit including an over-current circuit-breaker-and-recloser device; whereby said batteries are normally connected in parallel by said devices in said sub-circuits but upon energizing said control circuit said batteries are automatically switched in series connected relation with said starter motor and said sub-circuits are momentarily opened by said circuit-breaker-and-recloser devices, thus applying the additive voltage of said batteries to said starter motor.

11. In an electrical booster system for momentarily increasing the available battery voltage which includes a pair of batteries and a power circuit connected to unlike poles of each battery; the combination comprising: a pair of over-current, automatic circuit-breaker-and-recloser devices, each connected in a sub-circuit between like pairs of poles of said batteries; and a normally-open series switch connected between the unlike poles of said batteries not connected to said power circuit; whereby said batteries are normally connected in parallel relation, but upon closure of said series switch said batteries are switched to series connected relation and said automatic circuit-breaker-and-recloser devices momentarily open said sub-circuits, thus applying the additive voltage of said batteries to said power circuit.

References Cited in the file of this patent

UNITED STATES PATENTS

| | | |
|---|---|---|
| 2,344,568 | Snyder | Mar. 21, 1944 |
| 2,521,969 | Dugan | Sept. 12, 1950 |
| 2,725,488 | Hueffed et al. | Nov. 29, 1955 |